Nov. 25, 1924.    1,516,914
W. H. CROFT ET AL
BEARING AND METHOD OF MANUFACTURING THE SAME
Filed March 29, 1923
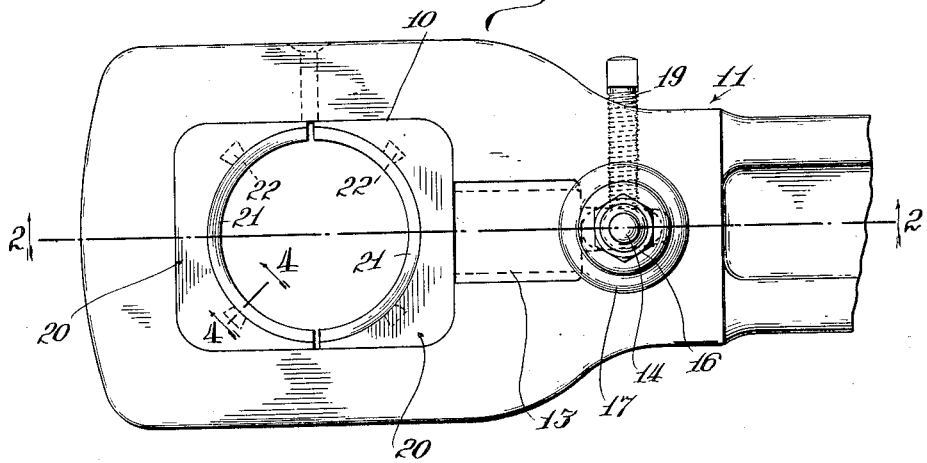
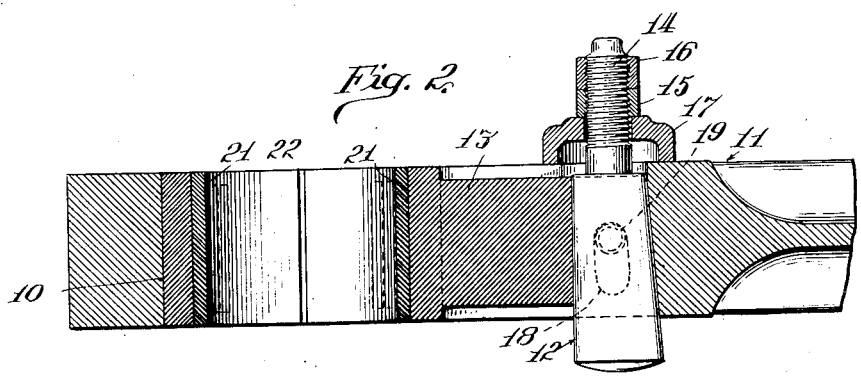
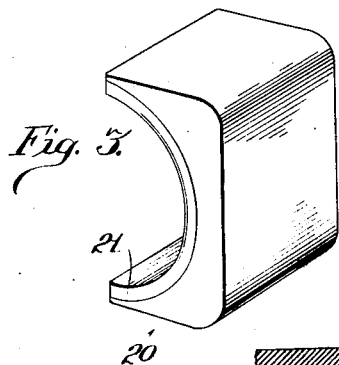
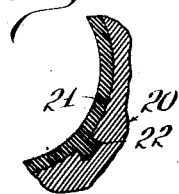
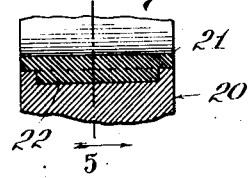
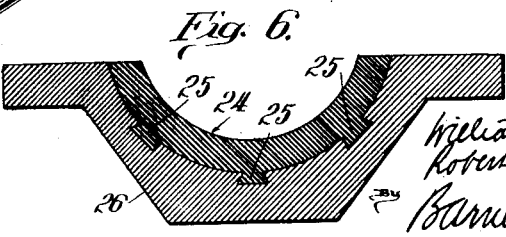
Inventors
William H. Croft
Robert J. Shoemaker
By Barnett & Furman
Attorneys Patented Nov. 25, 1924.

1,516,914

UNITED STATES PATENT OFFICE.

WILLIAM H. CROFT AND ROBERT J. SHOEMAKER, OF CHICAGO, ILLINOIS.

BEARING AND METHOD OF MANUFACTURING THE SAME.

Application filed March 29, 1923. Serial No. 628,423.

*To all whom it may concern:*

Be it known that we, WILLIAM H. CROFT and ROBERT J. SHOEMAKER, citizens of the United States, residing at Chicago, in the county of Cook and State of Illinois, have invented certain new and useful Improvements in Bearings and Methods of Manufacturing the Same, of which the following is a specification.

Our invention relates to bearings, and more particularly to bearings for severe and heavy service such as the bearing used in the construction of locomotive and railway car trucks.

The principal object of the invention is to provide a composite bearing element consisting of a body of tough metal having integrally united therewith a facing of a metal having lubricating properties, which bearing element is of such character that it may be manufactured at a relatively low cost and will be durable and capable of withstanding the wear and tear to which such devices are necessarily subjected in railroad service or in other like situations.

We have shown and will describe our invention as applied to two different types of bearing, one the bearing between the wrist pin and connecting rod of a locomotive, and the other a journal bearing for supporting an axle journal on a car or locomotive truck.

In the drawing,

Fig. 1 is a fragmentary view of the forward end of a locomotive connecting rod provided with a wrist pin bearing made in accordance with our invention.

Fig. 2 is a sectional view on line 2—2 of Fig. 1.

Fig. 3 is a view, in perspective, of one of the two bearing elements constituting the bearing shown in Figs. 1 and 2.

Fig. 4 is a detail sectional view on line 4—4 of Fig. 1.

Fig. 5 is a sectional view on line 5—5 of Fig. 4, and

Fig. 6 is a longitudinal sectional view of a truck journal bearing.

It has been usual to make the bearing elements of a locomotive wrist pin bearing of a copper base, alloyed with tin and lead, the common composition being an alloy of 80% copper, 10% tin and 10% lead.

A pair of such bearing elements are arranged in an opening 10 in the forward end of the connecting rod 11 (Figs. 1 and 2) and are forced against the connecting wrist pin, which makes the connection between the connecting rod and cross head, by means of a wedge 12 which bears against a steel block 13 interposed between the wedge and one of the bearing elements. The wedge is arranged in a slot in the connecting rod and is provided with a threaded take-up stem 14, on which are mounted adjusting nut 15 and lock nut 16, the nut 15 bearing against a washer 17 engaging the side of the connecting rod. The wedge is ordinarily slotted as at 18 (Fig. 2) for a retaining pin 19. In a bearing of this sort it is necessary that the bearing elements be kept tightly pressed against the wrist pin. This is the reason for the wedge take-up. But if the bearing elements are made of the usual copper alloy (some such composition being necessary in order that they may have the necessary lubricating properties) it is very difficult to keep the bearing tight around the wrist pin. This is due less to the friction between the wrist pin and the bearing elements, the friction being relatively inconsiderable, than to the constant pulling and pushing of the wrist pin first on one bearing element and then on the other resulting from the reciprocatory movements of the connecting rod and cross head. These longitudinally exerted stresses against the bearing are very great and tend to crush the bearing elements causing their edges in contact with the connecting rod to wear and slough off. As soon as any looseness develops the impacts of the wrist pin against the bearing elements accompanied by the slight rotary movements of the bearing result in an overheating of the bearing elements which is very destructive.

In accordance with our invention, the body 20 of the bearing element, instead of being made of the copper alloy above referred to, commonly known as bearing metal, is composed of a much tougher, harder metal, and in order to give the bearing element the necessary lubricating properties there is united to the body 20 a bushing 21 which may be composed of the copper alloy above referred to.

In manufacturing one of these bearing elements one first casts the bearing metal (preferably 80% copper, 10% tin and 10% lead) in the form of a bushing but formed, preferably, with longitudinal ribs 22 which fall short, preferably, of the edges of the cylinder. This cylinder is made a trifle smaller in diameter than the diameter of the wrist pin. It is split in half lengthwise and one of the half cylinders placed over one of the dies of a die casting machine. The body 20 is then die cast upon and around the bushing. The metal used for the body 20 is preferably the ordinary die casting metal consisting of a zinc base alloyed with copper and aluminum, for example, a metal consisting of 85% zinc, 7% copper and 8% aluminum. The copper content may be increased to give greater toughness. A metal of this composition will have a melting point considerably lower than the melting point of the metal composing the bushing. The latter will ordinarily melt at approximately 1700° Fahrenheit, while the die casting metal will melt at about 900° Fahrenheit. It is, therefore, feasible to die cast the body on and around the bushing. When the body has thus been cast upon the bushing the bushing is bored out to fit the wrist pin. Each bearing element is, therefore, in accordance with this particular method of manufacture, which may be varied, a little less than a half cylinder so that spaces 23 intervene between such members to allow take-up as the bushings wear.

The composite bearing element produced in this way is much tougher than the bearing elements made entirely of the copper alloy as heretofore used. It is, therefore, an easier matter to prevent overheating by keeping the bearing elements wedged tightly against the wrist pin. The ribs 22 on the bushing, which are preferably of a dovetailed configuration as indicated in Figs. 1 and 5, and are preferably though not necessarily shorter than the axial dimension of the bushing, as shown in Fig. 4, prevent any breaking of the bond between the bushing and the die cast body.

The bearing element of our invention has other advantages over the old type of device. It can be manufactured more cheaply since the die cast body may be formed accurately to fit the opening in the connecting rod and with smooth surfaces so that machining is unnecessary. With the ordinary sand cast copper bearing the outer surfaces must be carefully machined and this requires considerable time and labor.

Our invention may also be utilized to advantage in the manufacture of journal box bearings or brasses. The body portion of these devices have ordinarily been made of copper alloyed with lead and tin, usually in the proportions of 75% copper, 20% lead and 5% tin. After the body has been cast and machined it is stood on end against a mandrel and babbitt poured in between the curved face of the body and the mandrel.

In accordance with our invention, in the manner in which we prefer to practice it in connection with this type of bearing, a bushing 24 (Fig. 6) is first cast composed of an alloy of copper and lead, known commonly as packing metal, and consisting of approximately 50% of copper and 50% of lead. This composition has a melting point of about 1900° Fahrenheit. The bushing is preferably formed with bonding ribs 25 and is made of substantially uniform thickness throughout. The body of the bearing element, designated 26, is composed of die casting metal and is die cast upon and around the bushing 24 by an operation corresponding to that described in connection with the manufacture of the wrist pin bearing. The bearing surface of the bushing is then bored out and the device is ready for use.

The babbitted journal box brasses heretofore in general use in the journal boxes of railway car trucks and locomotive trailer trucks have certain disadvantageous features which are not to be found in the bearing elements as manufactured in accordance with out invention. The babbitt coating tends to crack under the impact of the axles whereas the packing metal which we propose to use is much tougher and more durable, while its lubricating properties are substantially equal to those of babbitt. Because of the softness of babbitt it is not possible to make the babbitt coating very thick. The babbitt is ordinarily not more than a quarter of an inch thick at the thickest point. Moreover, because of the manner in which the babbitt is cast upon the brass the babbitt lining necessarily diminishes in thickness toward its edges. For these reasons the babbitt soon wears out and it is because of this that the body of the bearing is made of metal having some lubricating properties. The brass must be fairly strong so that a compromise has to be effected between strength and lubricating properties. In our bearing the packing metal used is much tougher than babbitt so that it can be made considerably thicker. Moreover, it can be made of equal thickness throughout. Furthermore, by having the body of the element of die casting metal, which affords the requisite strength and toughness, the bushing may be made to contain a sufficient amount of lead so as to give the bearing surface of the device the requisite lubricating properties. In the old method of making journal box brasses there is often a taper in the direction lengthwise of the journal caused by a defective casting, and when the brass is babbitted the babbitt takes the same taper. Besides this, the brass is not always aligned with the mandrel with perfect accuracy which will also result in a defect of the sort noted. In our new method of making the journal box brasses, there is less likelihood of such a taper occurring, and if such a defect should occur, it will be eliminated by the final boring process.

We claim:

1. A bearing element consisting of a body of lubricating metal formed on the back with ribs and a metallic body die cast around the same to form an integral structure therewith.

2. A locomotive connecting rod wrist pin bearing element consisting of a metal body composed principally of a zinc base alloyed with copper and aluminum integrally united by die casting with a bushing member composed of a copper base alloyed with tin and lead.

3. A journal bearing consisting of a body of metal having a relatively low melting point and composed principally of a zinc base alloyed with tin, copper and aluminum, integrally united by die casting with a metal lining having a relatively high melting point and composed of copper and lead in substantially equal proportions.

4. Method of manufacturing a bearing element which consists in first forming an anti-friction member of alloyed copper and then die casting thereon a metal body having a zinc base.

5. A composite journal bearing consisting of a relatively thin body of lubricating metal having a relatively high melting point and a reinforcing body enclosing the same having a relatively low melting point, one of which bodies is united to the other by die casting.

WILLIAM H. CROFT.
ROBERT J. SHOEMAKER.